United States Patent
Hall et al.

(10) Patent No.: US 11,591,927 B1
(45) Date of Patent: Feb. 28, 2023

(54) TURBINE ENGINE FAN TRACK LINER WITH OUTER FLANGE CASE MOUNTING

(71) Applicants: Rolls-Royce Corporation, Indianapolis, IN (US); Rolls-Royce North American Technologies Inc., Indianapolis, IN (US)

(72) Inventors: Christopher D. Hall, Indianapolis, IN (US); Robert W. Heeter, Noblesville, IN (US); Daniel E. Molnar, Jr., Lebanon, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/553,702

(22) Filed: Dec. 16, 2021

(51) Int. Cl.
| | | |
|---|---|---|
| F01D 21/04 | (2006.01) | |
| F01D 25/24 | (2006.01) | |
| F02C 7/00 | (2006.01) | |
| F01D 11/12 | (2006.01) | |

(52) U.S. Cl.
CPC .......... *F01D 21/045* (2013.01); *F01D 11/122* (2013.01); *F01D 11/125* (2013.01); *F01D 25/243* (2013.01); *F02C 7/00* (2013.01); *F05D 2220/323* (2013.01); *F05D 2240/14* (2013.01)

(58) Field of Classification Search
CPC ...... F01D 11/12; F01D 11/122; F01D 11/125; F01D 11/127; F01D 21/045; F05D 2240/014
See application file for complete search history.

(56) References Cited

U.S. PATENT DOCUMENTS

| | | | |
|---|---|---|---|
| 5,388,959 A * | 2/1995 | Forrester | F01D 11/125 415/197 |
| 6,123,170 A | 9/2000 | Porte et al. | |
| 6,382,905 B1 | 5/2002 | Czachor et al. | |
| 6,761,245 B2 | 7/2004 | Porte | |
| 6,920,958 B2 | 7/2005 | Harrison | |
| 7,503,425 B2 | 3/2009 | Strunk | |
| 7,866,939 B2 | 1/2011 | Harper et al. | |
| 7,967,108 B2 | 6/2011 | Harper | |
| 8,650,853 B2 | 2/2014 | Porte et al. | |
| 8,672,609 B2 | 3/2014 | Lussier et al. | |
| 9,683,490 B2 | 6/2017 | Harper et al. | |
| 9,702,375 B2 | 7/2017 | Costa et al. | |
| 9,932,897 B2 | 4/2018 | Riou et al. | |
| 10,260,522 B2 | 4/2019 | Heeter et al. | |
| 10,612,564 B2 | 4/2020 | Heeter et al. | |

(Continued)

FOREIGN PATENT DOCUMENTS

WO  WO-2016054669 A1 *  4/2016  ........... F01D 21/045

OTHER PUBLICATIONS

English machine translation of WO-2016054669-A1, Jul. 29, 2022.*

*Primary Examiner* — Christopher Verdier
(74) *Attorney, Agent, or Firm* — Barnes & Thornburg LLP

(57) ABSTRACT

A fan case assembly is adapted to extend around blades of a fan rotor included in a gas turbine engine. The fan case assembly includes an annular case that extends around an axis, a fan track liner coupled to the annular case and extending circumferentially at least partway about the axis, and a bolting arrangement that couples the fan track liner to the annular case.

15 Claims, 6 Drawing Sheets

(56) References Cited

U.S. PATENT DOCUMENTS

| | | | |
|---|---|---|---|
| 2012/0099981 A1* | 4/2012 | Verseux | F02C 7/32 |
| | | | 415/200 |
| 2014/0294572 A1* | 10/2014 | Hillier | F01D 11/122 |
| | | | 415/177 |
| 2015/0308290 A1* | 10/2015 | Kappes | F01D 25/24 |
| | | | 415/200 |
| 2017/0037740 A1* | 2/2017 | O'Leary | F01D 11/24 |
| 2018/0347585 A1 | 12/2018 | Unton | |
| 2019/0136711 A1* | 5/2019 | Worthoff | F04D 29/023 |
| 2020/0325851 A1 | 10/2020 | Higbie et al. | |

* cited by examiner

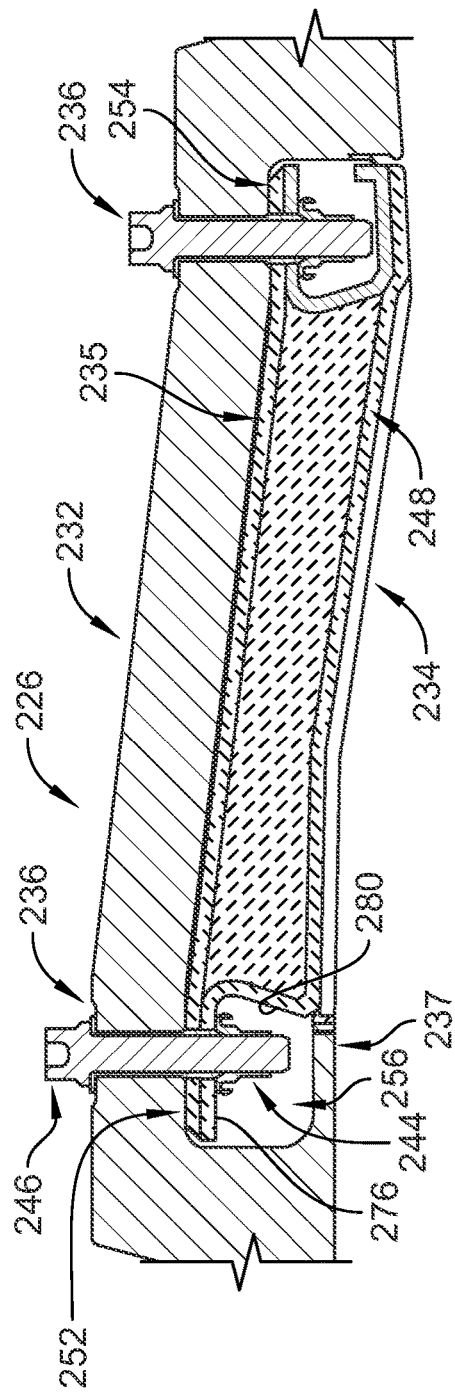

TURBINE ENGINE FAN TRACK LINER WITH OUTER FLANGE CASE MOUNTING

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to fan track liners for gas turbine engines.

BACKGROUND

Gas turbine engines used in aircraft often include a fan assembly that is driven by an engine core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from liberating from the fan assembly in case of a blade-off event in which a fan blade is released from the fan rotor.

Fan cases sometimes include metallic shrouds and liners positioned between the metallic shroud and the fan blades. Liners are generally used to achieve a desired dimensional tolerance between the fan blades and the fan case as well as provide a zone of frangible material for the fan blades to traverse during a fan blade-off event and subsequent fan rotor orbiting such that damage to the fan rotor is limited. The distance between the fan blades and the fan case may vary due to variations in dimensional tolerances or thermo-mechanical deflections. As such, liners may include an abradable layer that the fan blades may contact without damaging them while keeping tight tip clearance for efficiency.

Liners may be coupled to metallic shrouds by hanger features that extend from the metallic shrouds or by adhesives that provide a permanent bond to the metallic shrouds. Over time, it may be desirable to repair or replace the liners. Accordingly, fan liners for fan rotors and methods of mounting the fan liners to the engine remain an area of interest.

SUMMARY

The present disclosure may comprise one or more of the following features and combinations thereof.

According to a first aspect of the present disclosure, a fan case assembly is adapted to extend around blades of a fan rotor included in a gas turbine engine. The fan case assembly includes an annular case, a fan track liner, and a bolting arrangement. The annular case extends circumferentially around an axis. The annular case has an inner radial surface and an outer radial surface opposite the inner radial surface and facing away from the axis. The fan track liner is coupled to the annular case and extends circumferentially at least partway about the axis. The fan track liner includes a radially outer surface and a radially inner surface. The fan track liner defines a cavity that extends axially to provide a radially intermediate surface located radially between the radially outer surface and the radially inner surface.

In some embodiments, the bolting arrangement couples the fan track liner to the annular case. The bolting arrangement includes a first captured nut and a first attachment fastener. The first captured nut is fixed to the radially intermediate surface and located in the cavity. The first attachment fastener extends radially through the outer radial surface of the annular case, the inner radial surface of the annular case, and into the cavity to mate with the first captured nut to couple the fan track liner with the annular case.

In some embodiments, the fan track liner includes a liner body and a forward support channel coupled to a forward end of the liner body, and the forward support channel includes a radially outer flange, a radially inner flange, and a flange webbing that extends between and interconnects the radially outer flange and the radially inner flange.

In some embodiments, the flange webbing is coupled to an axially aft end of the radially outer flange and the radially inner flange and the cavity is open at an axially forward end of the radially outer flange and the radially inner flange.

In some embodiments, the fan track liner further includes a liner-core cover including a radially outer skin coupled to the radially outer flange and the liner body and a radially inner skin coupled to the radially inner flange and the liner body.

In some embodiments, the radially outer skin includes a carbon-reinforced polymer outer layer and a glass-reinforced polymer inner layer and wherein the radially inner skin includes a carbon-reinforced polymer layer.

In some embodiments, the radially inner skin is formed to include a recess that is offset axially from the forward support channel and aligned axially with the liner core, and wherein the fan track liner further includes an abradable layer located within the recess and that faces toward the axis.

In some embodiments, the fan track liner further includes an aft support channel coupled to an aft end of the liner core and arranged to lie radially between the radially outer skin and the radially inner skin, the aft support channel defines a second cavity radially between the radially outer skin and the radially inner skin and located axially aft of the liner core, and wherein the bolting arrangement further includes a second captured nut fixed to the aft support channel and a second attachment fastener that extends radially through the outer radial surface of the annular case, the inner radial surface of the annular case, and into the second cavity to mate with the second captured nut.

In some embodiments, the forward support channel includes a glass-reinforced polymer, and wherein the radially outer flange of the forward support channel is bonded to the radially outer skin by a first supported adhesive layer and the radially inner flange of the forward support channel is bonded to the radially inner skin by a second supported adhesive such that loads are transferred from the radially inner skin, through the flange webbing to the radially outer skin.

In some embodiments, a layer of unsupported adhesive is arranged to lie between the liner core and the radially outer skin and between the liner core and the radially inner skin and wherein a layer of foamed adhesive is arranged to lie axially between the liner core and the forward support channel.

In some embodiments, a first seal is positioned axially between a forward end of the fan track liner and the annular case and a second seal is positioned axially between an aft end of the fan track liner and the annular case.

According to another aspect of the present disclosure, a fan case assembly includes an annular case that extends around an axis, a fan track liner coupled to the annular case and extending circumferentially at least partway about the axis, and a bolting arrangement that couples the fan track liner to the annular case. The fan track liner includes a radially inner surface facing toward the axis and a radially outer surface facing away from the axis and formed to define a cavity that extends axially into the fan track liner to define a radially intermediate surface radially between the radially inner surface and the radially outer surface. The radially intermediate surface faces inward toward the axis.

In some embodiments, the bolting arrangement includes a first captured nut and a first attachment fastener. The first captured nut is fixed to the radially intermediate surface and located in the cavity. The first attachment fastener extends radially through the annular case, into the fan track liner, and into the cavity to mate with the first captured nut to couple the fan track liner with the annular case.

In some embodiments, the fan track liner includes a liner body and a forward support channel coupled to a forward end of the liner body, the liner body defines the radially inner surface and the outer surface, and the first support channel forms the cavity radially between the radially outer surface and the radially inner surface.

In some embodiments, the liner body includes a liner core, a radially outer skin coupled to a radially outer surface of the liner core, and a radially-inner skin coupled to a radially inner surface of the liner core, and wherein the cavity is located radially between the radially outer skin and the radially inner skin.

In some embodiments, the forward support channel includes a radially outer flange coupled to the radially outer skin, a radially inner flange coupled to the radially inner skin, and a flange webbing that extends between and interconnects the radially outer flange and the radially inner flange.

In some embodiments, the flange webbing is coupled to an axially aft end of the radially outer flange and the radially inner flange and the cavity is open at an axially forward end of the radially outer flange and the radially inner flange.

In some embodiments, the forward support channel includes a glass-reinforced polymer, and wherein the radially outer flange of the forward support channel is bonded to the radially outer skin by a first supported adhesive layer and the radially inner flange of the forward support channel is bonded to the radially inner skin by a second supported adhesive such that loads are transferred from the radially inner skin, through the flange webbing to the radially outer skin, wherein a layer of unsupported adhesive is arranged to lie between the liner core and the radially outer skin and between the liner core and the radially inner skin, and wherein a layer of foamed adhesive is arranged to lie axially between the liner core and the forward support channel.

In some embodiments, the fan track liner further includes an aft support channel coupled to an aft end of the liner body, the aft support channel defines a second cavity radially between the radially outer surface and the radially inner surface, and wherein the bolting arrangement further includes a second captured nut fixed to the aft support channel and a second attachment fastener that extends radially through the outer radial surface of the annular case, the inner radial surface of the annular case, and into the second cavity to mate with the second captured nut.

In some embodiments, the fan track liner includes a liner body, a forward flange coupled to a forward end of the liner body, and an aft flange coupled to an aft end of the liner body, the liner body defines the radially inner surface and the radially outer surface, the forward flange partially defines the cavity radially between the radially outer surface and the radially inner surface, and the aft flange partially defines a second cavity radially between the radially outer surface and the radially inner surface.

In some embodiments, the liner body includes a liner core, a radially outer skin coupled to a radially outer surface of the liner core, the forward flange, and the aft flange, and a radially-inner skin coupled to a radially inner surface of the liner core, and wherein the cavity and the second cavity are located radially between the radially outer skin and the radially inner skin.

In some embodiments, the radially inner skin is formed to include a recess that is offset axially from the forward support channel and aligned axially with the liner core, and wherein the fan track liner further includes an abradable layer located within the recess and that faces toward the axis.

These and other features of the present disclosure will become more apparent from the following description of the illustrative embodiments.

BRIEF DESCRIPTION OF THE DRAWINGS

FIG. 6 is cross sectional view of another fan track liner and another annular case that can be used with the gas turbine engine shown in FIG. 1, the fan track liner including a forward support upstand and the annular case including a flange that underlies the forward support upstand of the fan track liner to establish a cavity between the forward support upstand and the flange of the annular case that receives a captured nut and a portion of an attachment fastener to mount the fan track liner to the annular case;

FIG. 7 is a cross sectional view of another fan track liner and another annular case that can be used with the gas turbine engine shown in FIG. 1, the fan track liner including a monolithic liner body that is formed to include forward and aft cavities formed in opposite axial ends of the liner body to provide a radially inner flange and a radially outer flange at the forward and aft ends of the fan track liner, each radially outer flange configured to receive a captured nut and a corresponding attachment fastener to mount the fan track liner to the annular case from outside the engine.

DETAILED DESCRIPTION OF THE DRAWINGS

Figure 1:
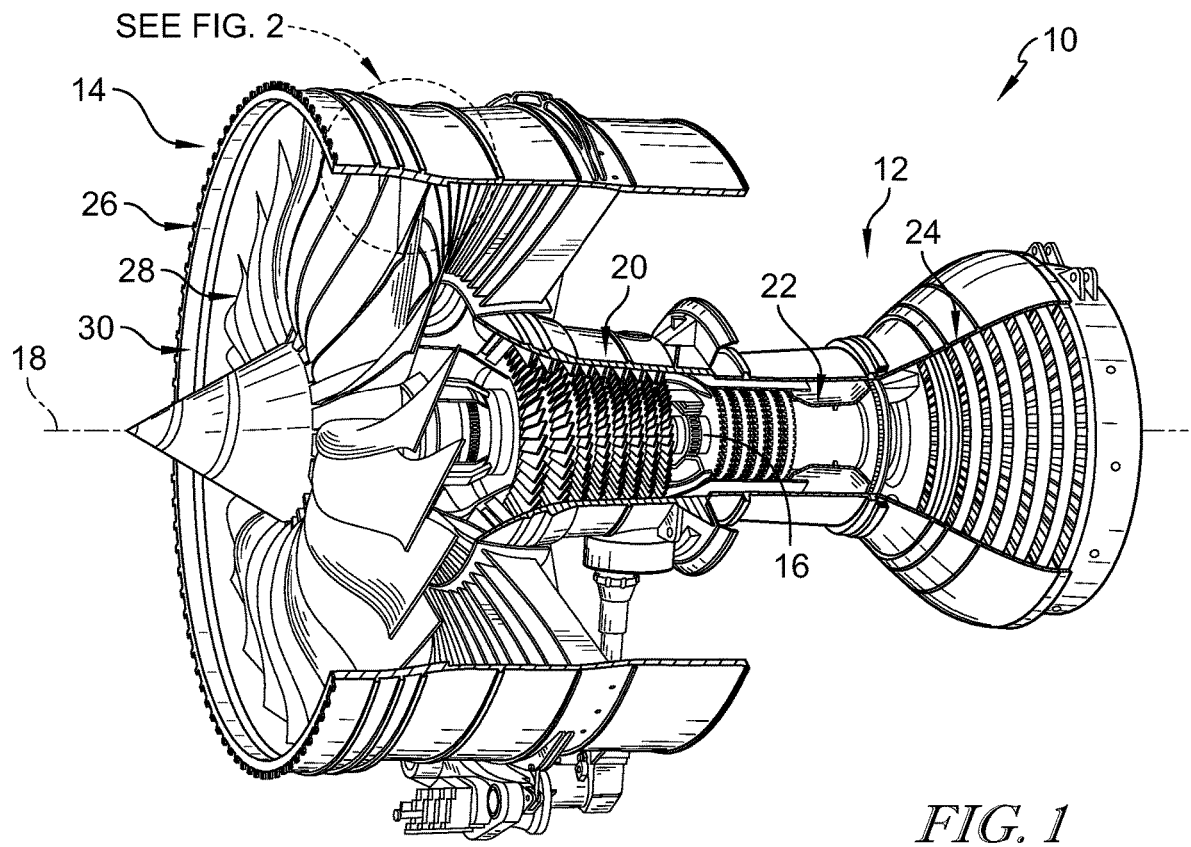
FIG. 1 is a cutaway view of a gas turbine engine that includes a fan, a compressor, a combustor, and a turbine, the fan including a fan rotor with fan blades configured to rotate about an axis of the engine and a fan case assembly that surrounds the fan blades and showing that the fan case assembly includes an annular case and a fan track liner coupled to the annular case to line the radial tips of the fan blades.

For the purposes of promoting an understanding of the principles of the disclosure, reference will now be made to a number of illustrative embodiments illustrated in the drawings and specific language will be used to describe the same.

A gas turbine engine 10 in accordance with the present disclosure is shown in FIG. 1 and includes an engine core 12 and a fan 14 arranged upstream of the engine core 12. The engine core 12 is configured to compress and combust air entering the gas turbine engine 10 to drive rotation of one or more shafts 16 about a rotation axis 18 of the gas turbine engine 10. The one or more shafts 16 interconnect the engine core 12 and the fan 14 to cause rotation of the fan 14 and to provide thrust for the gas turbine engine 10.

The engine core 12 includes a compressor 20, a combustor 22, and a turbine 24. The compressor 20 includes one or more stages of rotating blades that compress air entering the engine core 12 and produce pressurized air which is transferred downstream to the combustor 22. The combustor is configured to mix fuel with the pressurized air and combust the fuel and pressurized air to produce combustion products which are transferred downstream to the turbine 24. The turbine 24 also includes one or more stages of rotating blades which are coupled to the one or more shafts 16 and are driven in rotation about the axis 18. Rotation of the one or more shafts 16 causes rotating components of the fan 14 to rotate about the axis 18.

The fan 14 includes a fan case assembly 26 extending circumferentially about the axis 18 and a plurality of rotating blades 28 spaced radially inward of the fan case assembly 26 as shown in FIG. 1. The fan case assembly 26 provides an outer boundary of a flowpath 30 into the gas turbine engine 10 and lines the plurality of rotating blades 28. The plurality of rotating blades 28 extend from a hub that is coupled to at least one of the one or more shafts 16 for rotation therewith about the axis 18. During operation, radial tips of the plurality of rotating blades 28 interface with portions of the fan case assembly 26. Interaction between the fan case assembly 26 and the radial tips of the plurality of rotating blades 28 is configured to minimize pressure losses and increase efficiencies of the gas turbine engine 10.

Figure 2:
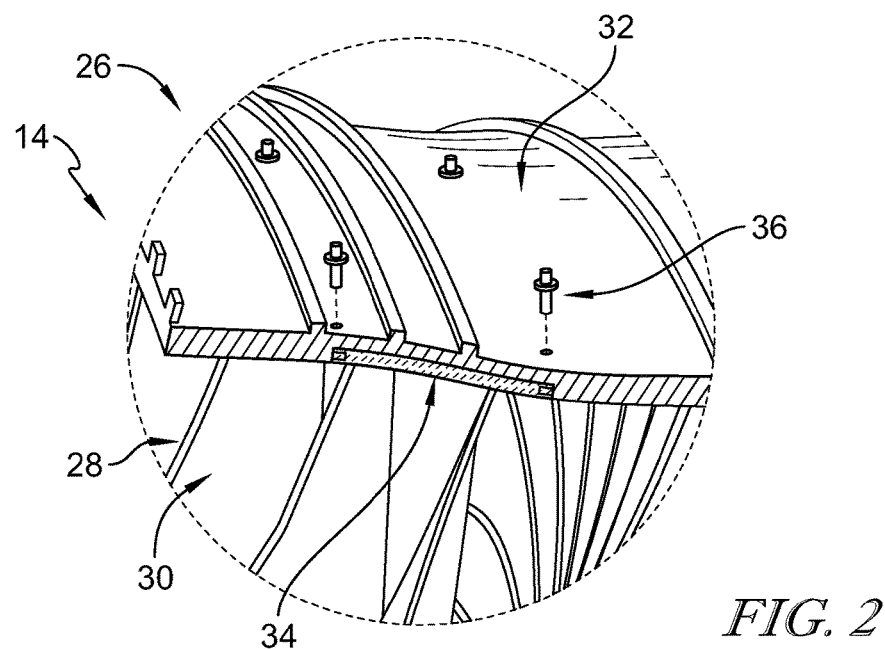
FIG. 2 is an enlarged view of a portion of the fan case assembly of FIG. 1 with portions exploded away showing that the fan case assembly further includes a bolting arrangement including a first captured nut arranged to lie within a cavity defined by the fan track liner and a first attachment that extends radially through the annular case and into the cavity defined by the fan track liner from radially outside the gas turbine engine to facilitate installation of the fan track liner into the annular case and removal of the fan track liner from the annular case for service or replacement.

The fan case assembly 26 is fixed relative to the plurality of blades 28 and illustratively includes an annular case 32, a fan track liner 34 supported by the annular case 32, and a bolting arrangement 36 configured to secure the fan track liner 34 to the annular case 32 as shown in FIG. 2. The annular case 32 extends circumferentially about the axis 18 of the gas turbine engine 10. The fan track liner 34 also extends circumferentially around the axis 18 and may form a full hoop or a plurality of circumferentially spaced sections that line the radial tips of the plurality of blades 28. The fan track liner 34 is located radially inward of at least a portion of the annular case 32 and is located directly outward of the radial tips of the plurality of blades 28 to interface with the radial tips of the plurality of blades 28 during operation. The bolting arrangement 36 couples the fan track liner 34 to the annular case 32 in a way that facilitates assembly of the fan case assembly 26 while minimizing obstructions in the flowpath 30.

Figure 3:
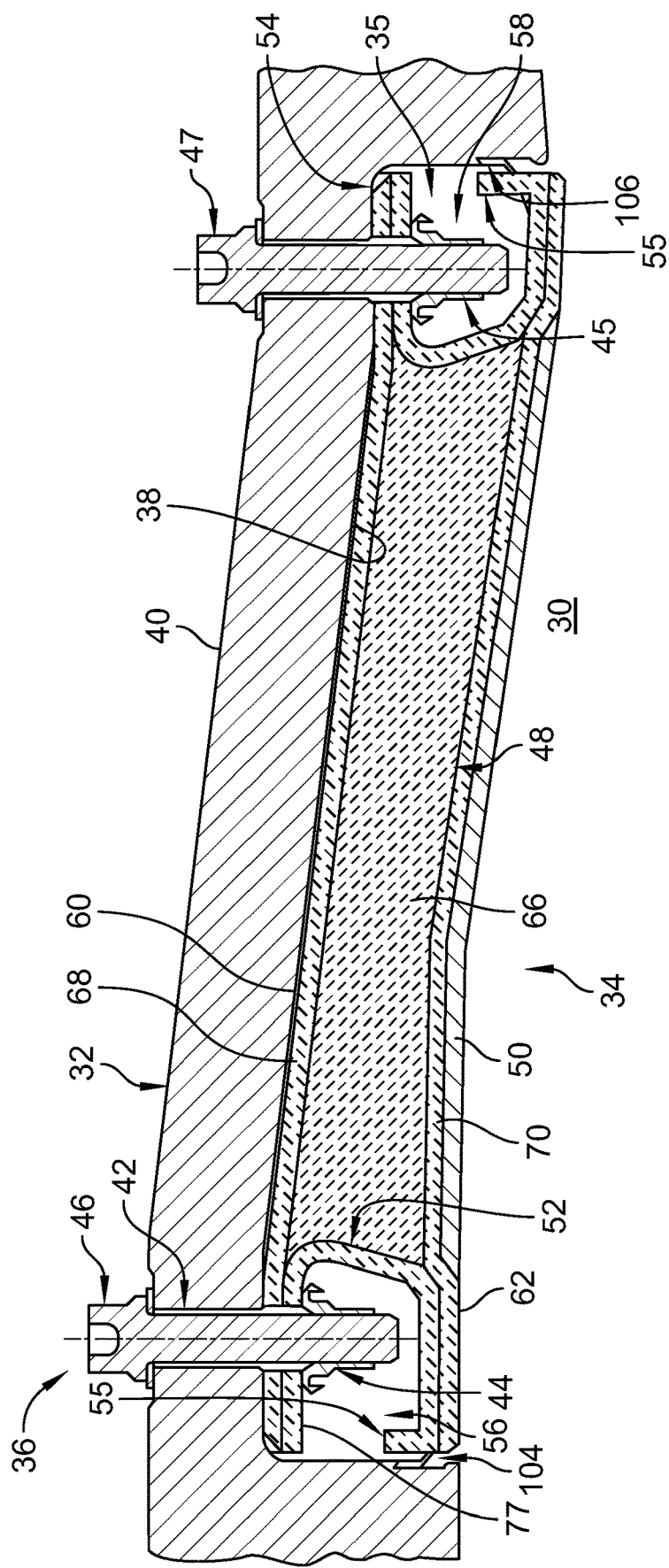
FIG. 3 is a cross-sectional view of the fan case assembly of FIG. 2 showing that the fan track liner includes a liner body, a forward support channel that defines the cavity at a forward end of the fan track liner, and an aft support channel that defines a second cavity at an aft end of the fan track liner and that is configured to receive a second captured nut and a second attachment fastener that extends through the annular case and into the second cavity to retain the aft end of the fan track liner to the annular case.

The annular case 32 has an inner radial surface 38 and an outer radial surface 40 opposite the inner radial surface 38 and facing away from the axis 18 as shown in FIG. 3. The annular case 32 is formed to include at least one fastening aperture or passageway 42 that extends all the way through the annular case 32 from the outer radial surface 40 to the inner radial surface 38. The annular case 32 is formed to include a pocket 35 that opens and faces toward axis 18. The fan track liner 34 is arranged to lie within the pocket 35 and is retained in the pocket 35 by the bolting arrangement 36.

The bolting arrangement 36 includes at least one captured nut 44 (also called a retainer) coupled to the fan track liner 34 and at least one corresponding attachment fastener 46 coupled to the annular case 32 as shown in FIGS. 2 and 3. The captured nut 44 is fixed to the fan track liner 34 and is configured to receive the attachment fastener 46. The attachment fastener 46 extends through the aperture 42 from outside the flowpath 30 and is received in the captured nut 44 to secure the fan track liner 34 to the annular case 32.

The fan track liner 34 includes a liner body 48, an abradable layer 50 coupled to the liner body and facing toward the plurality of blades 28, and one or more support channels 52 coupled to the liner body 48 as shown in FIGS. 2 and 3. The liner body 48 is at least partially formed from an aluminum honeycomb material and is positioned radially between the annular case 32 and the abradable layer 50. The abradable layer 50 is optional and is configured to interface with the plurality of blades 28 to minimize spacing between the radial tips of the plurality of blades 28 and the fan track liner 34. The support channel 52 is coupled to an axially-forward and/or axial aft end of the liner body 48 and supports the captured nut 44 relative to the liner body 48 for receipt of the attachment fastener 46.

In the illustrative embodiment, the fan track liner 34 includes both forward and aft support channels 52, 54 that each receive corresponding captured nuts 44, 45 and attachment fasteners 46, 47 as shown in FIGS. 2 and 3. Each support channel 52, 54 at least partially defines a cavity 56, 58 that is spaced apart from the flowpath 30. The cavities 56, 58 are located radially between a radially outer surface 60 of the liner body 48 and a radially inner surface 62 of the liner body 48. All portions of the nutplates 44, 45 and the attachment fasteners 46, 47 are spaced apart from the flowpath 30 and the radially inner surface 62 of the liner body 48. No portions of the captured nuts 44, 45 and the attachment fasteners 46, 47 protrude into or define the flowpath 30. The radially inner surface 62 of the liner body 48 may be aligned with flowpath surfaces of the annular case 32 to provide a continuous flowpath surface defining the flowpath 30. The radially inner surface 62 of the liner body 48 may be entirely covered by abradable 50 in some embodiments.

Figure 4:
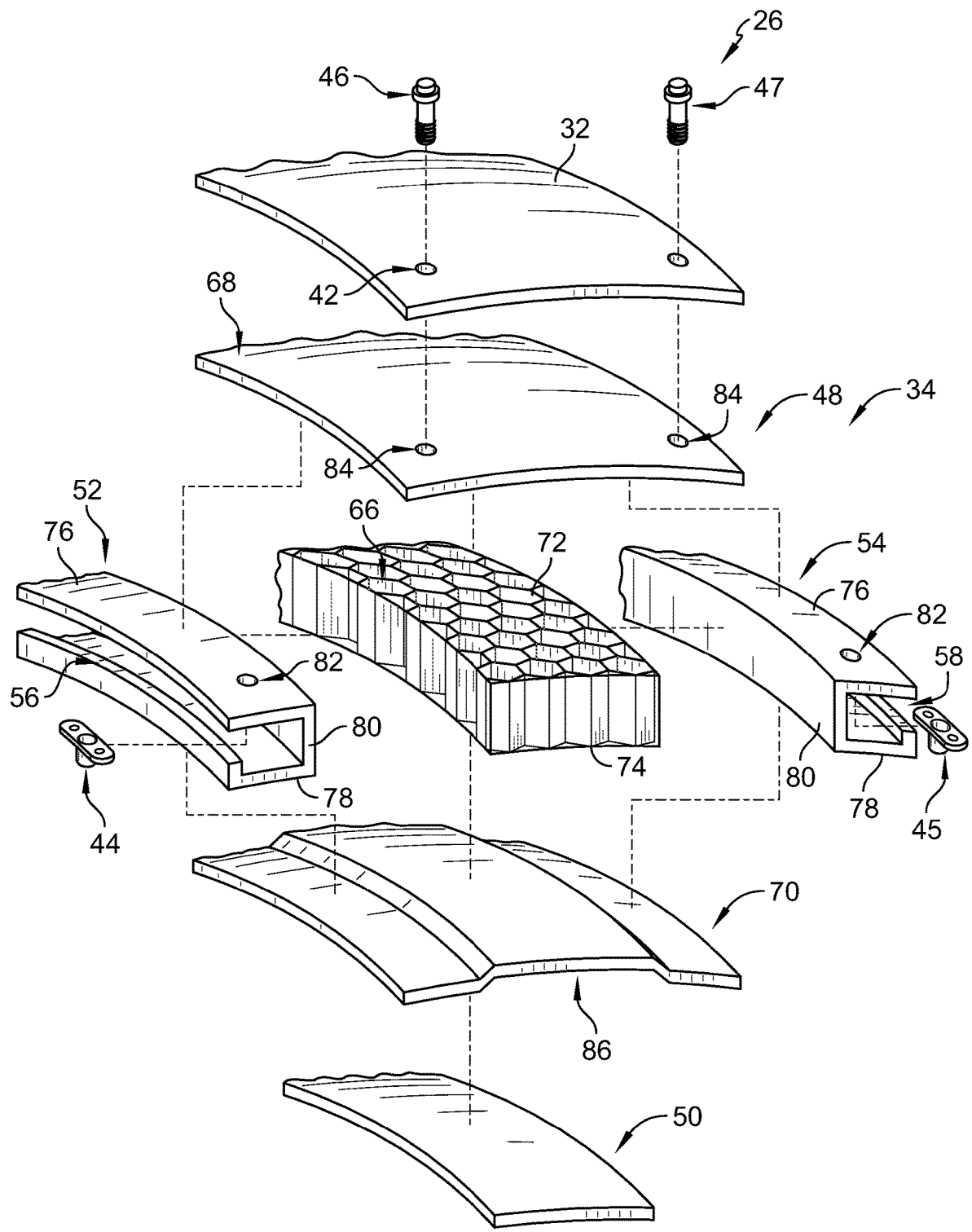
FIG. 4 is an exploded assembly view of the fan track liner and the annular case showing that the liner body includes a liner core and inner and outer core skins coupled to the forward and aft support channels to locate the forward and aft support channels radially between the inner and outer core skins and axially forward of and aft of the liner core, respectively.
Figure 5:
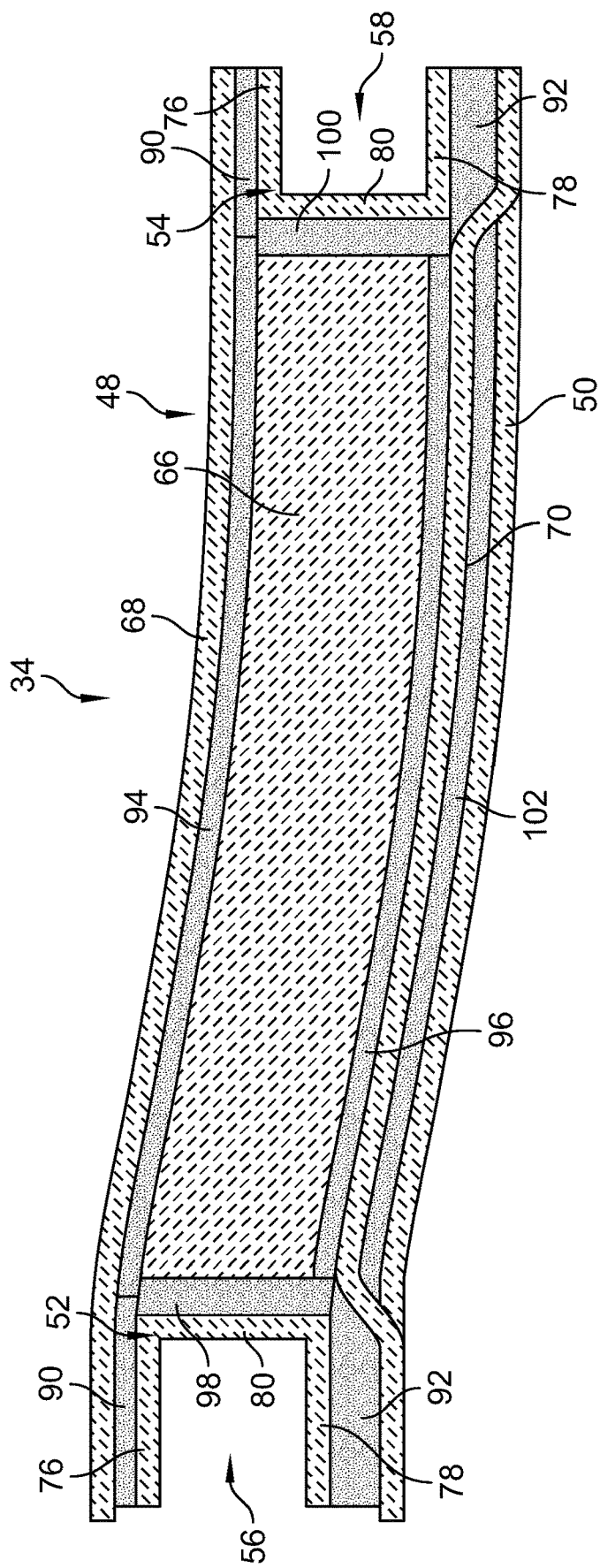
FIG. 5 is a cross-sectional view of the fan track liner showing that the fan track liner is illustratively made from the core, skins, and channels shown in FIG. 4 and further includes an adhesive assembly configured to join portions of the liner body and the forward and aft support channels to one another to form a composite fan track liner assembly that forms the fan track liner shown in FIGS. 2-4.

In some embodiments, all or portions of the fan track liner 34 may be made from a plurality of separate components that are adhered together to form a composite fan track liner 34 as suggested in FIGS. 4 and 5. The liner body 48 includes a liner core 66 and a liner-core cover having a radially outer skin 68 coupled to an outer surface 72 of the liner core 66 and a radially inner skin 70 coupled to an inner surface 74 of the liner core 66. The liner core 66 may be made from an aluminum honeycomb material that provides weight-efficient structural support. The radially outer skin 68 and the radially inner skin 70 each have a length that is greater than the liner core 66 and partially couple to both the forward attachment channel 52 and the aft attachment channel 54. In some embodiments, forward and/or aft portions of the skins 68, 70 provide part of the forward and/or aft support channel 52, 54.

The radially outer skin 68 and the radially inner skin 70 may each include a carbon-reinforced polymer ply or layer that increases strength and stiffness of the fan track liner 34. In some embodiments, the radially outer skin 68 and the radially inner skin 70 include a plurality of carbon-reinforced polymer plies or layers that are stacked radially on top of one another. In some embodiments, the radially outer skin 68 and/or the radially inner skin 70 may further include one or more glass-reinforced polymer plies or layers positioned radially between the carbon-reinforced polymer ply(s) and the liner core 66 to provide galvanic protection and block chemical reaction between the aluminum honeycomb material and the carbon-reinforced polymer ply(s).

The forward support channel 52 is coupled to a forward end of the liner core 66 and arranged to lie radially between the radially outer skin 68 and the radially inner skin 70. The forward support channel 52 is at least partially and generally C-shaped to define the cavity 56 radially between the radially outer skin 68 and the radially inner skin 70. The cavity 56 is located axially forward of the liner core 66 and is open in a forward or upstream direction to receive the captured nut 44 during assembly. The captured nuts 44, 45 may be riveted to the liner 34 during part manufacture such that it is in place before the liner 34 is inserted into the case pocket 35.

The aft support channel 54 is similarly shaped compared to the forward support channel 52 except that the second cavity 58 defined by the aft support channel 54 opens in a rearward or downstream direction opposite the first cavity 56. Accordingly, only the forward support channel 52 is described below and the disclosure of the forward support channel 52 is incorporated by reference for the aft support channel 54. Similar reference numbers are used to reference common features between the forward support channel 52 and the aft support channel 54.

The forward support channel 52 includes a radially outer flange 76 coupled to the radially outer skin 68, a radially inner flange 78 coupled to the radially inner skin 70, and a webbing 80 that extends between and interconnects the radially outer flange 76 and the radially inner flange 78 as shown in FIGS. 4 and 5. The radially outer flange 76 is manufactured to include an aperture 82 or passageway that is aligned with aperture 42 in annular case 32. The captured nuts 44, 45 are coupled to a radially intermediate surface 77 of each corresponding radially outer flange 76 and aligned with a corresponding aperture 82 to receive a corresponding attachment fastener 46, 47 passing through apertures 42, 82 to secure the fan track liner 34 to the annular case 32. The radially intermediate surface 77 is spaced apart from and positioned radially between the radially outer and inner surfaces 60, 62 of the liner body 48. Each support channel 52, 54 may further include an upstand 55 coupled to a distal end of the radially inner flange 78 and that extends radially outward away from the axis 18 to partially enclose an axial opening into each cavity 56, 58.

The radially outer skin 68 may at least partially overlie the radially outer flange 76 to reinforce the forward and/or aft support channel 52, 54 and may be formed to include an aperture 84 that is aligned with the aperture 82 formed in the radially outer flange 76 when fully assembled. The fan track liner 34 may be fully assembled and then the apertures 84 can be drilled into the fan track liner 34. The radially inner flange 78 is arranged radially inward of the radially outer flange 76 to define the cavity 56, 58 radially between the radially outer flange 76 and the radially inner flange 78. In some embodiments, the radially inner flange 78 may be omitted. The webbing 80 is coupled to an axial end of both the radially outer flange 76 and the radially inner flange 78 and extends generally in a radial direction relative to axis 18.

In the illustrative embodiment, each support channel 52, 54 is made from one or more glass-reinforced polymer plies or layers. In other embodiments, another suitable material may be used to form the support channel 52, 54 such as a carbon-reinforced polymer, for example. The support channels 52, 54 may also include a chopped fiber sheet molding compound.

The radially inner skin 70 may be formed to include recess 86 that is offset axially from the support channels 52, 54 and aligned axially with the liner core 66 as shown in FIGS. 3 and 4. The abradable layer 50 is located within the recess 86 and faces toward the axis 18 and the plurality of blades 28. The abradable layer 50 has a thickness that is about equal to a depth of the recess 86 so that inward-facing surfaces of the radially inner skin 70 bordering the recess 86 are flush with an inward-facing surface of the abradable layer 50.

The captured nuts 44, 45 are each fixed to a radially inner surface of each corresponding radially outer flange 76 as shown in FIGS. 3 and 4. In the illustrative embodiment, each captured nut 44, 45 is a riveted nut plate that is coupled to the corresponding radially outer flange 76 by fasteners or adhesives to at least temporarily retain the captured nut 44, 45 in place prior to receiving the attachment fastener 46, 47. In other embodiments, a different type of retainer may be used in place of a riveted nut plate. Each attachment fastener 46, 47 may be a bolt or another similar fastener having a length sufficient to reach the captured nut 44, 45 from radially outward of the annular case 32. Each captured nut 44, 45 and attachment fastener 46, 47 has complementary threads that interlock when fully assembled to secure the fan track liner 34 to the annular case 32.

The fan track liner 34 further includes a plurality of adhesive layers that join the liner body 48 to the forward and aft support channels 52, 54 as shown in FIG. 5. Each of the adhesive layers are shown with exaggerated thicknesses in FIG. 5 but it should be appreciated that the thicknesses of each adhesive layer may vary relative to one another and relative to each component of the liner body 48 and the support channels 52, 54.

The radially outer flange 76 of the support channels 52, 54 are bonded to the radially outer skin 68 by a first supported adhesive layer 90 as shown in FIG. 5. The radially inner flange 78 of the support channels 52, 54 are bonded to the radially inner skin 70 by a second supported adhesive 92. Loads acting on the fan track liner 34 are transferred from the radially inner skin 70, through the flange webbing 80 to the radially outer skin 68 due to the support channels 52, 54 being bonded to the radially outer and inner skins 68, 70. The first and second supported adhesive layers 90, 92 include a carrier and an adhesive resin infused about the carrier. If included in the fan track liner 34, the abradable layer 50 may be bonded to the radially inner skin by a third layer of supported adhesive layer 102. The supported adhesive layers 90, 92, 102 are a medium weight supported film adhesive in the illustrative embodiment, however, in other embodiments, other variations of adhesives can be used.

The liner core 66 is bonded to the radially outer skin 68 by a first layer of unsupported adhesive 94 as shown in FIG. 5. The liner core 66 is also bonded to the radially inner skin 70 by a second layer of unsupported adhesive 96. Each unsupported adhesive 94, 96 is not reticulated and includes and/or consists of an adhesive resin.

Each support channel 52, 54 is bonded to the liner core 66 by a layer of foamed adhesive 98, 100 as shown in FIG. 5. Each layer of foamed adhesive 98, 100 is arranged to lie axially between the liner core 66 and the corresponding support channel 52, 54. The foamed adhesive 98, 100 is configured to expand upon curing and is configured to extend into and fill voids in the liner core 66 to minimize air gaps between the support channels 52, 54 and the liner core 66. The foamed adhesive 98, 100 may be a foaming film adhesive or an epoxy foaming filler, for example.

In some embodiments, the fan case assembly 26 may further include a first seal 104 positioned axially between a forward end of the fan track liner 34 and the annular case 32 and a second seal 106 positioned axially between an aft end of the fan track liner 34 and the annular case 32 as shown in FIG. 3. In the illustrative embodiment, the first and second seals 104, 106 are flap seals that are coupled to the annular case and are self-biasing into engagement with the fan track liner 34 to seal between the fan track liner 34 and the annular case 32 at the flowpath 30. Other types of seals may also be used in place of the flap seals 104, 106 such as rope seals or bulb seals.

Another embodiment of a fan case assembly 226 that can be used with gas turbine engine 10 is shown in FIG. 6. The fan case assembly 226 is substantially similar to the fan case assembly 26 of FIGS. 1-5. Similar reference numbers are used to describe similar features that are common between fan case assembly 226 and fan case assembly 26. The disclosure of fan case assembly 26 is incorporated by reference herein for fan case assembly 226 except for the differences discussed below.

Fan case assembly 226 includes an annular case 232, a fan track liner 234, and a bolting arrangement 236 as shown in FIG. 6. The annular case 232 is formed to include a pocket 235 opening toward axis 18. The fan track liner 234 is arranged to lie within the pocket 235 and is secured to the annular case 232 by the bolting arrangement 236 in substantially the same manner described above with fan case assembly 26.

The annular case 232 includes an axially-extending flange 237 that extends axially aft from a front edge defining the pocket 235 as shown in FIG. 6. The fan track liner 234 includes a forward support upstand 252. The forward support upstand 252 is arranged to lie directly outward of the flange 237 such that a cavity 256 is defined radially between the forward support upstand 252 and the flange 237 of the annular case 232. In this way, the forward support upstand 252 includes only a radially outer flange 276 and a support webbing 280 and does not include the radially inner flange 78 of fan track liner 34. A similar arrangement may be provided between aft support channel 254 and annular case 232.

With the arrangement shown in FIG. 6, the bolting arrangement 236 may only include a captured nut 244 and an attachment fastener 246 coupled to the aft support channel 254. A forward end of the fan track liner 234 may be supported radially by the flange 237 such that no captured nuts or attachment fasteners are used to retain the forward end to the annular case 232. In some embodiments an aft end of the fan track liner 234 may be supported radially by a portion of the annular case 232 while only the forward end of the fan track liner 234 is secured to the annular case 232 by a captured nut and an attachment fastener.

Another embodiment of a fan case assembly 326 that can be used with gas turbine engine 10 is shown in FIG. 7. The fan case assembly 326 is substantially similar to the fan case assembly 26 of FIGS. 1-5. Similar reference numbers are used to describe similar features that are common between fan case assembly 326 and fan case assembly 26. The disclosure of fan case assembly 26 is incorporated by reference herein for fan case assembly 326 except for the differences discussed below.

Fan case assembly 326 includes an annular case 332, a fan track liner 334, and a bolting arrangement 336 as shown in FIG. 7. The annular case 332 is formed to include a pocket 335 opening toward axis 18. The fan track liner 334 is arranged to lie within the pocket 335 and is secured to the annular case 332 by the bolting arrangement 336 in substantially the same manner described above with fan case assembly 26.

The fan track liner 334 includes a liner body 348 that is monolithic as shown in FIG. 7. The fan track liner 334 is formed to include forward and aft cavities 356, 358 formed in axial ends of the fan track liner 334 to provide outer and inner flanges 376, 378. The outer flanges 376 have a radially intermediate surface 377 that is spaced apart radially between inner and outer surfaces of the fan track liner 334. The radially intermediate surface 377 is configured to receive a captured nut 344, 345. The captured nuts 344, 345 receive a corresponding attachment fastener 346, 347 to mount the fan track liner 334 to the annular case 332. In some embodiments, the fan track liner 334 may include only a cavity at a forward or aft end thereof. The monolithic liner 334 may be any material, including but not limited to, aluminum, titanium, or chopped sheet molding compound, for example.

Figure 8:
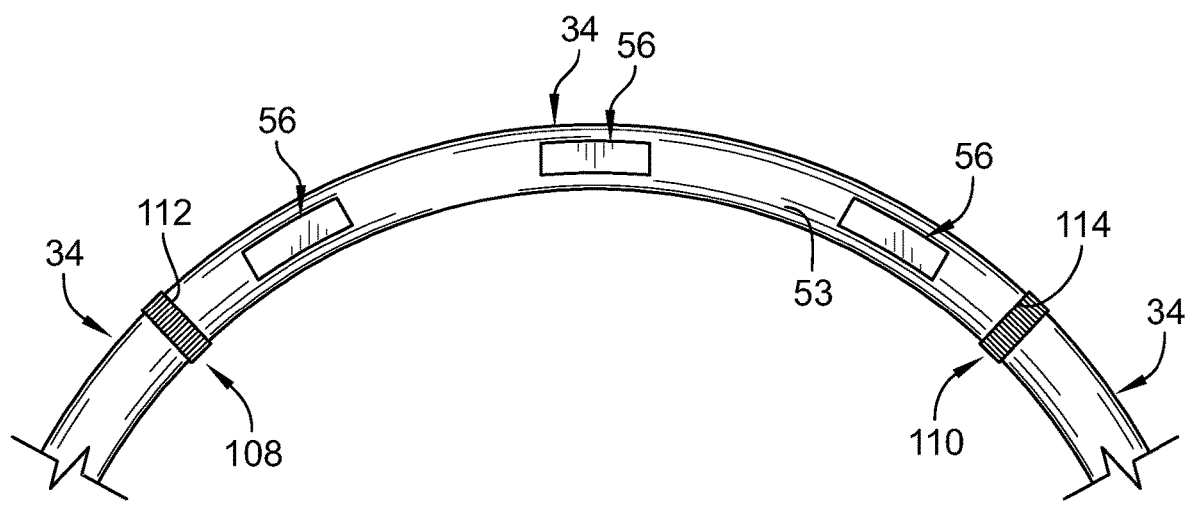
FIG. 8 is a side view of another embodiment of a fan track liner showing that the fan track liner includes a plurality of circumferentially spaced cavities formed by a forward support channel and a circumferential seal members that are configured to engage circumferential ends of neighboring fan track liners.

The fan track liner 34 of the present disclosure is divided into a plurality of segments that combine to form a continuous liner around the plurality of blades 28. One liner segment of the fan track liner 34 is shown in FIG. 8. The liner segment of the fan track liner 34 is arcuate to extend partway around the axis 18. First and second circumferential seals 108, 110 are coupled to corresponding circumferential ends 112, 114 of the liner segment. The seals 108, 110 are configured to engage neighboring liner segments to seal circumferentially therebetween. A forward facing end 53 of the liner segment of the fan track liner 34 may be formed to include a plurality of cavities 56 that each receive a captured nut 44 and a portion of the attachment fastener 46. Alternatively, the cavity 56 may extend continuously along a length of each segment of the fan track liner 34 as suggested in FIG. 4. The fan track liners 234, 334 may be formed in the same manner as fan track liner 34. Alternatively, the forward and aft channels may be hollow boxes with cavity 56 machined into the forward and aft channels where the captured nuts 44, 45 are to be located.

In some embodiments, fan rotors have abradable treatments or components surrounding blades of the fan rotor. These treatments or components may be included in a liner system that allows for sections to be removed and replaced as necessary. Removable liner assemblies may be complex to integrate and ensure a smooth flowpath transition between case and liner and may include fasteners on the inner surface defining the flowpath and/or potting which may not form a robust attachment for the liner.

In some embodiments, the present disclosure includes bolts coming from the outer side of the fan case so that no fasteners are on the inner surface defining the flowpath and no potting or filling is used. The bolts may go into captured nuts attached to the liner outer flanges 68, 76. Inner flanges 70, 78 provide a surface to partially define the flowpath. There may be seals between the liner and the case to avoid having to use fillers between the liner and the case. For example, the present disclosure includes no fillers within the cavities 56, 58 where the captured nuts 44, 45 and attachment fasteners 46, 47 mount to the fan track liner 34. There may be limited steps or interruptions, nearing a smooth, continuous surface.

In some embodiments, the fan track liners of the present disclosure are used in engine testing systems where multiple liner treatments may be exchanged during a test. During testing, replacement of liners with new definitions may occur frequently and having a fastener on the flowpath could disrupt the performance being captured during the tests. Likewise, fillers over fasteners or between liners and the case could make the test campaign last longer and cost more due to the time used for fillers to cure after application. The present disclosure might also be used on a production engine, if smooth flowpaths without disruptions and easy change-outs are desirable. The captured nuts provide float to allow for small mismatches between the apertures in the case and the liner and the captured nuts.

In some embodiments, in engines with bolted fan track liners, for example, the time to remove, replace, and cure fillers could impact turn-around times. Therefore, for the liner system to be removable, then filler can be minimized.

In some other fan case assemblies, there are fasteners on the inner flowpath just ahead of the fan that may not be filled over. These fasteners exposed to the flowpath can create flow disruptions or they may become damaged. In the present disclosure, the fan case assembly provides minimal or no flowpath fasteners.

In some embodiments, the present disclosure provides a method of attachment that allows for easier installation of each liner segment in a non-split case. In some embodiments, the liner segment may not be inserted over a hook/tab area on the case which could use an angled installation maneuver. Such a maneuver can be challenging if the liner segment is additionally bonded with an adhesive on the back side. Instead, in the present disclosure, the liner segment(s) can be inserted radially or nearly radially with only circumferential gaps between segments being a limitation on installation. This may also be an advantage for a split case where instrumentation or sensors may pass thru the liner, especially if the liner segment has adhesive on the back side.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted to extend around blades of a fan rotor included in a gas turbine engine, the fan case assembly comprising:
    an annular case that extends circumferentially around an axis, the annular case having an inner radial surface and an outer radial surface opposite the inner radial surface and facing away from the axis,
    a fan track liner coupled to the annular case and extending circumferentially at least partway about the axis, the fan track liner including a radially outer surface and a radially inner surface, the fan track liner defines a cavity that extends axially to provide a radially intermediate surface located radially between the radially outer surface and the radially inner surface, and
    a bolting arrangement that couples the fan track liner to the annular case, the bolting arrangement including a first captured nut and a first attachment fastener, the first captured nut fixed to the radially intermediate surface and located in the cavity, and the first attachment fastener extends radially through the outer radial surface of the annular case, the inner radial surface of the annular case, and into the cavity to mate with the first captured nut to couple the fan track liner with the annular case,
    wherein the fan track liner includes a liner body and a support channel coupled to an axial end of the liner body, the support channel including a radially outer flange, a radially inner flange, and a flange webbing that extends between and interconnects the radially outer flange and the radially inner flange, and
    wherein the cavity is open in an axial direction facing away from the liner body to an exterior of the cavity.

2. The fan case assembly of claim 1, wherein the support channel is a forward support channel and is coupled to a forward end of the liner body.

3. The fan case assembly of claim 2, wherein the flange webbing is coupled to an axially aft end of the radially outer flange and the radially inner flange and the cavity is open at an axially forward end of the radially outer flange and the radially inner flange.

4. The fan case assembly of claim 2, wherein the liner body includes a liner core and a liner-core cover including a radially outer skin coupled to the radially outer flange and the liner core and a radially inner skin coupled to the radially inner flange and the liner core.

5. The fan case assembly of claim 4, wherein the radially outer skin includes a carbon-reinforced polymer outer layer and a glass-reinforced polymer inner layer and wherein the radially inner skin includes a carbon-reinforced polymer layer.

6. The fan case assembly of claim 5, wherein the radially inner skin is formed to include a recess that is offset axially from the forward support channel and aligned axially with the liner body, and wherein the fan track liner further includes an abradable layer located within the recess and that faces toward the axis.

7. The fan case assembly of claim 4, wherein the fan track liner further includes an aft support channel coupled to an aft end of the liner body and arranged to lie radially between the radially outer skin and the radially inner skin, the aft support channel defines a second cavity radially between the radially outer skin and the radially inner skin and located axially aft of the liner body, and wherein the bolting arrangement further includes a second captured nut fixed to the aft support channel and a second attachment fastener that extends radially through the outer radial surface of the annular case, the inner radial surface of the annular case, and into the second cavity to mate with the second captured nut.

8. The fan case assembly of claim 4, wherein the forward support channel includes a glass-reinforced polymer, and wherein the radially outer flange of the forward support channel is bonded to the radially outer skin by a first supported adhesive layer and the radially inner flange of the forward support channel is bonded to the radially inner skin by a second supported adhesive such that loads are transferred from the radially inner skin, through the flange webbing to the radially outer skin.

9. The fan case assembly of claim 8, wherein a first layer of unsupported adhesive is arranged to lie between the liner body and the radially outer skin and a second layer of unsupported adhesive is arranged to lie between the liner body and the radially inner skin and wherein a layer of foamed adhesive is arranged to lie axially between the liner body and the forward support channel.

10. The fan case assembly of claim 1, further comprising a first seal positioned axially between a forward end of the fan track liner and the annular case and a second seal positioned axially between an aft end of the fan track liner and the annular case.

11. A fan case assembly adapted to extend around blades of a fan rotor included in a gas turbine engine, the fan case assembly comprising:
an annular case that extends around an axis,
a fan track liner coupled to the annular case and extending circumferentially at least partway about the axis, the fan track liner including a radially inner surface facing toward the axis and a radially outer surface facing away from the axis and formed to define a cavity that extends axially into the fan track liner to define a radially intermediate surface radially between the radially inner surface and the radially outer surface, the radially intermediate surface facing inward toward the axis, and
a bolting arrangement that couples the fan track liner to the annular case, the bolting arrangement including a first captured nut and a first attachment fastener, the first captured nut fixed to the radially intermediate surface and located in the cavity, and the first attachment fastener extends radially through the annular case, into the fan track liner, and into the cavity to mate with the first captured nut to couple the fan track liner with the annular case,
wherein the fan track liner includes a liner body and a forward support channel coupled to a forward end of the liner body, the liner body defines the radially inner surface and the outer surface, and the forward support channel forms the cavity radially between the radially outer surface and the radially inner surface,
wherein the forward support channel includes a radially outer flange coupled to a radially outer skin, a radially inner flange coupled to a radially inner skin, and a flange webbing that extends between and interconnects the radially outer flange and the radially inner flange, and
wherein the flange webbing is coupled to an axially aft end of the radially outer flange and the radially inner flange and the cavity is open at an axially forward end of the radially outer flange and the radially inner flange.

12. The fan case assembly of claim 11, wherein the forward support channel includes a glass-reinforced polymer, and wherein the radially outer flange of the forward support channel is bonded to the radially outer skin by a first supported adhesive layer and the radially inner flange of the forward support channel is bonded to the radially inner skin by a second supported adhesive such that loads are transferred from the radially inner skin, through the flange webbing to the radially outer skin, wherein a layer of unsupported adhesive is arranged to lie between a liner core and the radially outer skin and between the liner core and the radially inner skin, and wherein a layer of foamed adhesive is arranged to lie axially between the liner core and the forward support channel.

13. The fan case assembly of claim 11, wherein the fan track liner further includes an aft support channel coupled to an aft end of the liner body, the aft support channel defines a second cavity radially between the radially outer surface and the radially inner surface, and wherein the bolting arrangement further includes a second captured nut fixed to the aft support channel and a second attachment fastener that extends radially through the outer radial surface of the annular case, the inner radial surface of the annular case, and into the second cavity to mate with the second captured nut.

14. The fan case assembly of claim 13, wherein the liner body includes a liner core, the radially outer skin coupled to a radially outer surface of the liner core and the radially inner skin coupled to a radially inner surface of the liner core, and wherein the cavity and the second cavity are located radially between the radially outer skin and the radially inner skin.

15. The fan case assembly of claim 14, wherein the radially inner skin is formed to include a recess that is offset axially from the forward support channel and aligned axially with the liner core, and wherein the fan track liner further includes an abradable layer located within the recess and that faces toward the axis.

* * * * *